(12) United States Patent
Anquetil

(10) Patent No.: US 10,293,307 B2
(45) Date of Patent: *May 21, 2019

(54) TANGENTIAL FLOW SEPARATOR ELEMENT INCORPORATING FLOW OBSTACLES, AND METHOD OF FABRICATION

(71) Applicant: TECHNOLOGIES AVANCEES ET MEMBRANES INDUSTRIELLES, Nyons (FR)

(72) Inventor: Jérôme Anquetil, Vaison la Romaine (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 35 days.

This patent is subject to a terminal disclaimer.

(21) Appl. No.: 15/502,267

(22) PCT Filed: Jul. 21, 2015

(86) PCT No.: PCT/FR2015/052000
§ 371 (c)(1),
(2) Date: Feb. 7, 2017

(87) PCT Pub. No.: WO2016/024058
PCT Pub. Date: Feb. 18, 2016

(65) Prior Publication Data
US 2017/0239622 A1    Aug. 24, 2017

(30) Foreign Application Priority Data

Aug. 11, 2014 (FR) ................... 14 57745

(51) Int. Cl.
*B01D 46/24* (2006.01)
*B01D 63/06* (2006.01)
(Continued)

(52) U.S. Cl.
CPC .......... *B01D 65/08* (2013.01); *B01D 46/247* (2013.01); *B01D 46/2451* (2013.01);
(Continued)

(58) Field of Classification Search
None
See application file for complete search history.

(56) References Cited

U.S. PATENT DOCUMENTS 2,687,997 A * 8/1954 Felix ................. B01D 61/28
                                                    210/321.78
5,167,817 A * 12/1992 Bellhouse ............ B01D 63/082
                                                    210/321.75
(Continued)

FOREIGN PATENT DOCUMENTS

EP   0 813 445 B1   5/1999
FR   2 503 615 A1   10/1982
(Continued)

OTHER PUBLICATIONS

International Search Report dated Nov. 17, 2015 for Application No. PCT/FR2015/052000.
(Continued)

*Primary Examiner* — Ana M Fortuna
(74) *Attorney, Agent, or Firm* — Ladas & Parry LLP; Malcolm J. MacDonald

(57) ABSTRACT

The invention relates to a monolithic tangential flow separator element for separating a fluid medium for treatment, the element comprising a rectilinear rigid porous support (2) of three-dimensional structure having formed therein at least one channel (3) for passing a flow of the fluid medium for treatment in order to recover a filtrate at the peripheral surface of the support. The monolithic rigid porous support (2) includes obstacles (9) to the flow of the fluid for filtering on or in the inside wall(s)) of the channel(s), the obstacles
(Continued)

presenting identity of material and of porous texture with the support, and also presenting continuity of material and of porous texture with the support.

19 Claims, 3 Drawing Sheets

(51) Int. Cl.
*B01D 65/08* (2006.01)
*C04B 35/00* (2006.01)
*C04B 38/00* (2006.01)
*C04B 111/00* (2006.01)

(52) U.S. Cl.
CPC ....... *B01D 46/2474* (2013.01); *B01D 63/063* (2013.01); *B01D 63/066* (2013.01); *C04B 38/0009* (2013.01); *B01D 2321/2016* (2013.01); *C04B 2111/00793* (2013.01)

(56) References Cited

U.S. PATENT DOCUMENTS

| | | | | |
|---|---|---|---|---|
| 5,785,851 | A * | 7/1998 | Morris | B01D 29/031 210/489 |
| 7,261,813 | B2 * | 8/2007 | Marcus | B01D 15/08 210/198.2 |
| 9,540,977 | B2 * | 1/2017 | Sadaoka | F01N 3/0222 |
| 2005/0076627 | A1 * | 4/2005 | Itou | B01D 39/2068 55/523 |
| 2006/0000238 | A1 * | 1/2006 | Griffin | G01N 30/52 65/31 |
| 2011/0030829 | A1 * | 2/2011 | Nilsson | B01J 35/04 138/42 |
| 2017/0232393 | A1 * | 8/2017 | Anquetil | B01D 63/063 210/407 |
| 2017/0239622 | A1 * | 8/2017 | Anquetil | B01D 63/063 |

FOREIGN PATENT DOCUMENTS

| | | |
|---|---|---|
| FR | 2 503 616 A1 | 10/1982 |
| FR | 2 736 843 A1 | 1/1997 |
| GB | 2 223 690 A | 4/1990 |
| WO | 2012/032325 A1 | 3/2012 |
| WO | 2013/144399 A1 | 10/2013 |

OTHER PUBLICATIONS

International Search Report dated Nov. 17, 2015 for Application No. PCT/FR2015/051998.
Espacenet English abstract of FR 2 503 616 A1.
Espacenet English abstract of FR 2 736 843 A1.
Krstic, D. M., et al., "The effect of turbulence promoter on cross-flow microfiltration of skim milk", Journal of Membrane Science, vol. 208, 2002, pp. 303-314.
Jaffrin, M. Y., "Dynamic shear-enhanced membrane filtration: A review of rotating disks, rotating membranes and vibrating systems", Journal of Membrane Science, vol. 324, 2008, pp. 7-25.

* cited by examiner

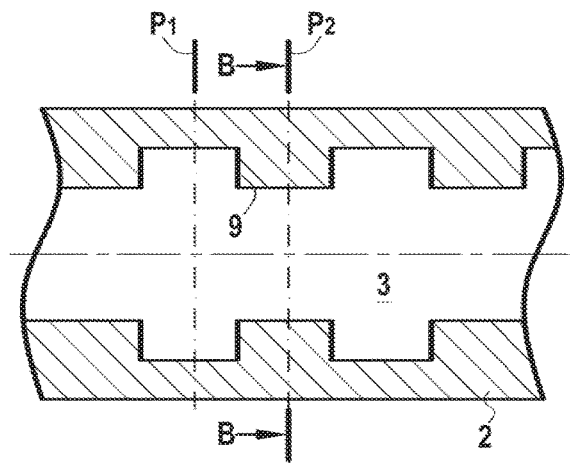
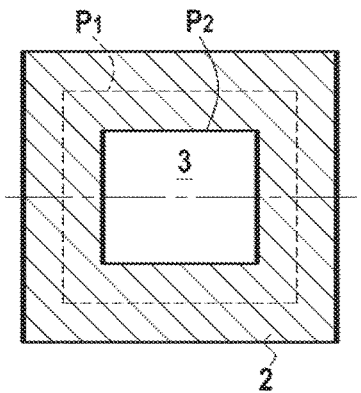
FIG.6A  FIG.6B
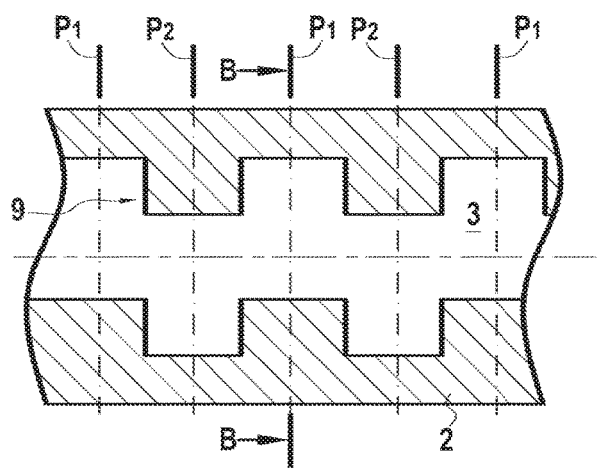
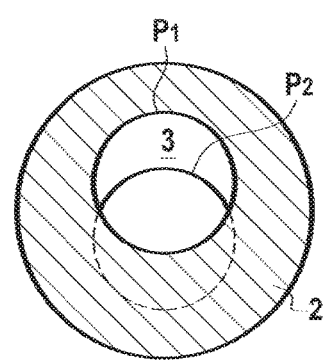
FIG.7A  FIG.7B
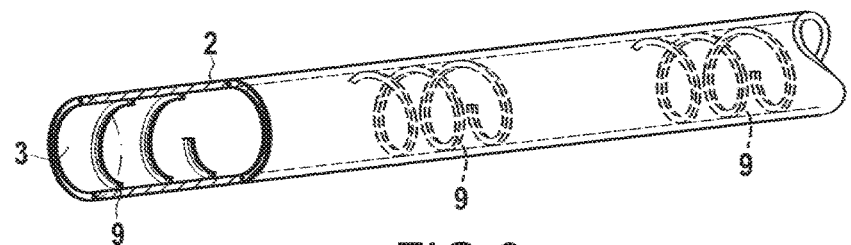
FIG.8

TANGENTIAL FLOW SEPARATOR ELEMENT INCORPORATING FLOW OBSTACLES, AND METHOD OF FABRICATION

The present invention relates to the technical field of elements for tangential flow separation of a fluid medium for treatment so as to produce a filtrate and a retentate, which elements are commonly referred to as filter membranes. More precisely, the invention relates to novel shapes for multichannel porous supports that serve to reduce, or even eliminate, problems of clogging, and also to an additive fabrication method of fabricating such supports, and to tangential flow separator elements including them.

Separation methods using membranes are used in numerous sectors, in particular in the environment for producing potable water and for treating industrial effluents, in the chemical, petrochemical, pharmaceutical, and agri-food industries, and in the field of biotechnology.

A membrane constitutes a selective barrier, and under the action of a transfer force, it serves to pass or to stop certain components of the medium for treatment. The components pass or stop as a result of their size relative to the size of the pores in the membrane, which then behaves as a filter. As a function of pore size, such techniques are referred to as "microfiltration", "ultrafiltration", or "nanofiltration".

There exist membranes having structures and textures that are different. In general, membranes are constituted by a porous support that provides the membrane with mechanical strength and that also gives it its shape and thus determines the filter area of the membrane. On this support, one or more separation-performing layers are deposited, each having a thickness of a few micrometers and referred to as "separator layers", "filter layers", or "active layers". During separation, the filtered fluid is transferred through the separator layer, and this fluid then spreads through the porous structure of the support in order to go towards the outside surface of the porous support. This portion of the fluid for treatment that has passed through the separation layer and the porous support is referred to as the "permeate" or "filtrate", and it is recovered by a collection chamber surrounding the membrane. The other portion is referred to as the "retentate", and, as a general rule, it is reinjected into the fluid for treatment upstream from the membrane, via a recirculation loop.

In conventional manner, the support is initially fabricated with the desired shape by extrusion, and is then sintered at a temperature and for a length of time that suffice to ensure the required strength, while conserving the desired texture of open and interconnected pores in the resulting ceramic. That method necessarily leads to one or more rectilinear channels being obtained, after which the separator layer(s) is/are subsequently deposited and sintered. Supports are traditionally tubular in shape having one or more rectilinear channels arranged parallel to the central axis of the support. In general, the inside surfaces of the channels are smooth and do not present any irregularities.

However, it has been found that filter membranes fabricated from supports having such shapes suffer from problems of clogging, and as a result they present performance that is limited in terms of flow rate. Specifically, small particles and macromolecules can be adsorbed on the surface of the separator layer or can become deposited thereon in the form of a gel or a deposit, and can even penetrate into the pores and block some of them.

All tangential separation making use of filter elements relies on the principle of selective transfer, with effectiveness that depends on the selectivity of the membrane (the active layer) and on the permeability (flow) of the filter element considered as a whole (support+active layer). Selectivity and permeability are determined by the characteristics of the active layer and of the filter element, but not only, since they can be reduced or limited by the appearance of a concentration polarization, a deposit, and/or blocking of the pores.

The phenomenon of concentration polarization occurs during a filtering operation when the macromolecules present in the liquid for treatment become concentrated at the membrane/solution interface, where they exert osmotic back-pressure opposing the separation force, or where they diffuse back into the core of the liquid for treatment in application of Fick's law. The concentration polarization phenomenon results from retained compounds accumulating in the vicinity of the membrane because of the permeation of the solvent.

The deposit appears during a filtering operation when the concentration of particles at the surface of the membrane increases sufficiently to cause a condensed phase to appear in the form of a gel or a cohesive deposit, giving rise to hydraulic resistance in addition to the resistance of the membrane.

Pore blocking occurs when there is intrusion of particles of sizes smaller than or equal to the sizes of the pores, thereby leading to a reduction in the filtering area.

Clogging, and its reversibility or non-reversibility, are phenomena that are complex and that depend on the filter element, and in particular on its separator layers, on the liquid for treatment, and on operating parameters.

Clogging is a major brake on the economic attractiveness of filtering, since, when designing filter installations, firstly it leads to increasing the installed areas in order to satisfy requirements in terms of volumes to be treated, and secondly it makes it necessary to use specific technical means for remedying clogging a posteriori, such as periodic cleaning cycles using detergents or back washing.

In the prior art, proposals have already been made to reduce the clogging phenomenon by creating turbulent flow conditions inside the channel of a filter element.

Initially, proposals were made to introduce turbulence-creating devices into tubular filter elements. Reference may be made in particular to D. M. Krstic et al., Journal of Membrane Science 208 (2002) pp. 303-314. By limiting clogging, those devices serve to improve the flow of permeate, and consequently the effectiveness of filtering. Nevertheless, installing and attaching such devices in tubular elements are operations that are difficult and complex. Furthermore, they give rise to troublesome vibration that is harmful for the reliability of the equipment.

Other rather complex systems have also been proposed by M. Y. Jaffrin in Journal of Membrane Science 324 (2008) pp. 7-25, and they make use of circular membranes and a central module that rotate relative to one another in order to create turbulence. That work has nevertheless demonstrated that the resulting large rate of shear serves to reduce clogging.

Other solutions consist in modifying the shape of the tubular element. Patent FR 2 503 615 describes cylindrical tubes for filtering gas mixtures injected under pressure, the inside walls of the tubes having indentations for creating turbulence that prevents one of the gas phases from accumulating on the wall of the tube and that improves separation by gaseous diffusion. The indentations are formed by causing the tubes leaving the extrusion die to pass between rollers or tools that deform the tubes locally over the entire thickness of their walls. Patent FR 2 503 616 describes a method based on the same principle, consisting in deforming the wall of the tube on leaving the extrusion die by applying knurling wheels arranged facing each other on either side of the tube, or in alternating positions.

In those two documents, after the prior step of extruding the single-channel tube, a final shaping step is thus performed by plastic deformation so as to obtain indentations inside the single channel by pressing a rotary punch or the like against the outside surface of the tube. Obtaining such "indentations" is easier or more difficult depending on the ductility of the material, i.e. its aptitude for being subjected to permanent deformation without breaking. However, the compounds that are used for fabricating ceramic membranes do not present good ductility: they are easily shaped by extrusion, but in general they present breaking elongation of less than 5%. Furthermore, with such techniques, it is possible to obtain indentations of small size only. Finally, deformations made throughout the thickness of the tube lead to high levels of stress in the material and to risks of cracking, thereby greatly degrading mechanical strength. It is also possible to mention application FR 2 736 843, which proposes porous tubes having a single channel with walls that include indentations, even though the peripheral wall of the support is smooth. To do this, the porous tube is shaped by means of an extrusion die that includes a cylindrical pin arranged along its axis, the pin or the outlet of the extrusion die being mounted to rotate and being of section that is not circular. Once more, that fabrication technique is limited to certain types of indentation, namely indentations that are continuous from one end to the other of the separator element, and it cannot generate any variation in the flow section of the channel. Furthermore, it cannot be transposed to fabricating a separator element having a series of internal channels. Nevertheless, there is an ever-increasing demand for multichannel separator elements, since they make it possible to increase filter surface area and thus to improve performance.

On the same lines, patent EP 0 813 445 describes a filter element with one or more channels, each including a helical groove that may be a single-, double-, or triple-start groove. That filter element presents the same drawbacks as the filter element described in document FR 2 736 843.

In this context, the present invention proposes providing novel filter elements and a fabrication technique adapted to making them, which filter elements present a single-channel or multichannel structure and a shape that is adapted to reducing clogging phenomena, or even to eliminating them. An object of the invention is to provide novel filter elements of shape that can be modulated to order, so as to create high surface shear stresses and intense turbulence inside the channels, but without presenting the drawbacks of prior art solutions.

In order to achieve such an object, the invention provides a monolithic tangential flow separator element for separating a fluid medium for treatment into a filtrate and a retentate, said separator element comprising a rectilinear rigid porous support of three-dimensional structure having arranged therein at least one channel for passing a flow of fluid medium for treatment in order to recover a filtrate from the outside surface of the support, the outside surface of the support presenting a profile that is constant.

According to the invention, the monolithic rigid porous support includes obstacles to the flow of the fluid for filtering on or in the inside wall(s) of the channel(s), the obstacles having identity and continuity of material and of porous texture with the support, these obstacles, by appearing between first and second positions taken along the longitudinal axis of the channel, obliging the fluid to flow around them, thereby impeding or disturbing the flow of the fluid.

Furthermore, the element of the invention may also present in combination at least one and/or others of the following additional characteristics:
- at least one obstacle of a channel generates a sudden narrowing or a converging nozzle in the flow direction of the fluid for treatment in said channel;
- at least one obstacle of a channel generates a flow right section that is locally narrower at the location of said obstacle, said flow right section being perpendicular to the longitudinal axis of said channel and presenting a shape that is different from the shape(s) of portions of the channel situated upstream and downstream from said obstacle;
- between a portion of the channel situated upstream from the narrowest flow right section and the narrowest flow right section, one of the criteria taken from the following list remains invariable, while the other criteria vary, the criteria being taken from: the shape, the area, the wetted perimeter, and the hydraulic diameter of the flow right section of the channel;
- between a portion of the channel situated upstream from the narrowest flow right section and the narrowest flow right section, all of the criteria taken from the following list remain invariable, namely: the shape, the area, the wetted perimeter, and the hydraulic diameter;
- at least one obstacle of the channel presents a flow right section perpendicular to the longitudinal axis of said channel, said flow right section turning about the longitudinal axis of said channel between two positions taken along the longitudinal axis of the channel;
- at least one obstacle of the channel presents a flow right section that turns about the longitudinal axis of said channel in discontinuous manner between the ends of said channel;
- the element includes at least one separator layer deposited continuously on the inside walls of the channels and completely covering the obstacles;
- the porous support is made of a material that is organic or inorganic;
- the separator layers or intermediate layers are made of a material that is organic or inorganic; and
- the three-dimensional structure of the porous support presents different plies that can be observed by optical microscopy or by scanning electron microscopy.

The invention also provides a method of making the monolithic separator elements in accordance with the invention.

The method of fabricating a tangential flow separator element of the invention consists in making the three-dimensional structure of the support by forming individual plies that are superposed and successively bonded to one another so as to build up the desired three-dimensional shape progressively.

Furthermore, the method of the invention may also consist in combination in at least one and/or others of the following additional characteristics:
- in making the three-dimensional structure by repeating the following steps:
  - making a continuous bed of a material that is to form the porous support, the bed being of constant thickness over an area greater than the section of said porous support at the ply;
  - locally consolidating some of the material to form a pattern that is determined for each ply, so as to create the individual ply while simultaneously bonding the individual ply has made in this way to the preceding ply;

in making continuous beds of solid material in the form of a powder or of liquid material such as photopolymerizable resins;

in making a continuous bed of a solid material in the form of a powder that is organic or inorganic;

in making a continuous bed of a medium in the form of a photopolymerizable liquid precursor having an inorganic powder disposed therein;

in that each ply is made by continuous or discontinuous melting of a string of a thermofusible solid precursor that is either a thermofusible organic polymer used on its own to make an organic support and an organic layer, or else a mixture for making a thermofusible organic polymer and a ceramic inorganic powder, with a support of inorganic nature; and in creating successive beads of material by spraying a powder that is melted in a laser beam.

The tangential flow separator elements obtained by the method defined in the context of the invention lead to building up the three-dimensional structure of the support. It should be observed that this structure is revealed by viewing the various plies by optical microscopy or by scanning electron microscopy. Naturally, it is desirable for the boundaries between the various plies to be as tenuous as possible.

Various other characteristics appear from the following description made with reference to the accompanying drawings, which show embodiments of the invention as nonlimiting examples.

FIGS. 6A and 6B are respectively a longitudinal section view and a cross section view of a support showing the invariable nature of the shape of the flow section of the channel while its dimensions vary.

FIGS. 7A and 7B are respectively a longitudinal section view and a cross section view of a support showing the invariable nature of the shape of the flow section of the channel with dimensions that are invariable.

FIG. 8 is a fragmentary longitudinal section view of a support showing turning of a flow section that is locally invariable.

Figure 1A:
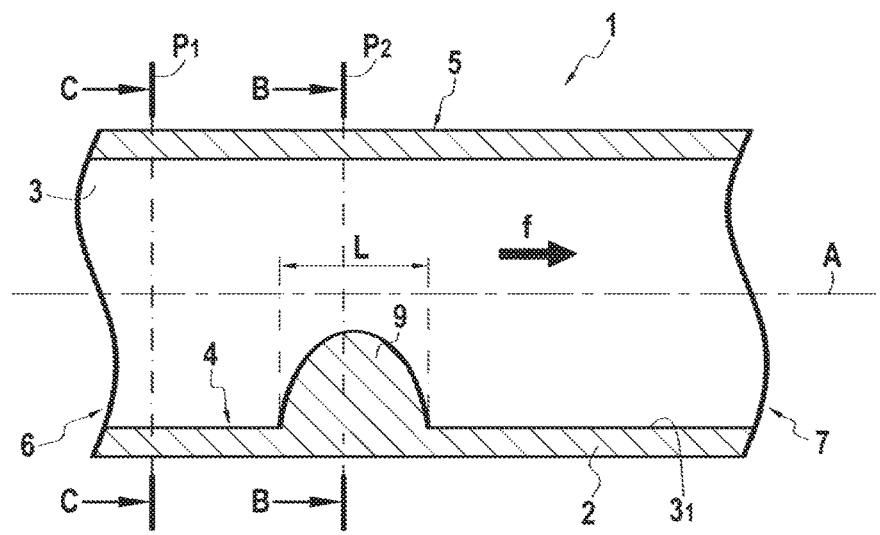
FIG. 1A is a longitudinal section view of a support showing an embodiment of an obstacle.

As a preliminary point, definitions are given of a few terms used in the context of the invention.

The term "mean grain size" is used to mean the d50 value for a volume distribution at which 50% of the total volume of the grains corresponds to the volume of grains having a diameter less than this d50 value. The volume distribution is the curve (analytic function) plotting grain volume frequencies as a function of grain diameter. The d50 value corresponds to the median between two equal portions of the area situated under the frequency curve as obtained by laser diffraction grain size, which is the reference technique used in the context of the invention for measuring the mean diameter of grains. Concerning the technique for measuring d50, reference may be made in particular to:

ISO standard 13320:2009, concerning the laser grain size measurement technique;

ISO standard 14488:2007, concerning techniques for sampling the powder under analysis; and ISO standard 14887:2000, concerning reproducibly dispersing the powder sample in the liquid prior to taking a measurement by laser grain size.

The term "mean pore diameter" is used to mean the d50 value of a volume distribution for which 50% of the total volume of the pores corresponds to the volume of pause having a diameter less than this d50 value. The volume distribution is the curve (analytic function) plotting grain volume frequencies as a function of pore diameter. The d50 value corresponds to the median between two equal portions of the area situated under the frequency curve obtained by mercury penetration for mean diameters of the order of a few nanometers (nm) or, for pores of smaller diameter, by adsorption of a gas, in particular $N_2$, with these two techniques being used as references in the context of the invention for measuring the mean diameter of the pores.

In particular, it is possible to use the techniques described in:

ISO standard 15901-1:2005, for the mercury penetration measurement technique; and ISO standards 15901-2:2006 and 15901-3:2007, for the gas and adsorption measurement technique.

The invention proposes tangential flow separator elements for separating a fluid medium for treatment into a filtrate and a retentate, where such an element comprises a single-channel or multichannel monolithic porous support of shape that is selected to define obstacles on the inside walls of the channels in order to impede the flow of the fluid for filtering. Such monolithic supports having obstacles that form integral portions of the monolithic porous structure are made by additive techniques, as explained in the description below.

In the context of the invention, the separator elements are for separating a fluid medium by tangential filtration, and they are commonly referred to as filter membranes. Such separator elements comprise a porous support having arranged therein one or more flow channels for the fluid that is to be filtered. Conventionally, the support is tubular in shape. Each flow channel presents an inlet and an outlet. In general, the inlets of the flow channels are located at one of the ends of the support, this end acting as an inlet zone for the fluid medium for treatment, and the outlets are positioned at the other end of the support acting as the outlet zone for the retentate.

In such separator elements, the body constituting the support presents a texture that is porous. This porous texture is characterized by the mean diameter of the pores, as deduced from their distribution as measured by mercury penetration porometry.

The porous texture of the support is open and forms an array of interconnected pores, thus enabling the fluid filtered by the filter separator layer to pass through the porous support and be recovered at its periphery. It is common practice to measure the water permeability of the support in order to qualify the hydraulic resistance of the support. Specifically, in a porous medium, the steady flow of an incompressible viscous fluid is governed by Darcy's law. The speed of the fluid is proportional to the pressure gradient and inversely proportional to the dynamic viscosity of the fluid, via a characteristic parameter known as "permeability", and by way of example, it can be measured in accordance with French standard NF X 45-101 of December 1996.

The permeate is thus recovered from the peripheral surface of the porous support. The walls of the channels are continuously covered by at least one filter separator layer that serves to filter the fluid medium for treatment. By definition, the filter separator layers must present a mean pore diameter that is smaller than that of the support. The separator layers define the surface of the tangential flow separator element that is to come into contact with the fluid for treatment and over which the fluid for treatment is to flow.

Figure 1C:
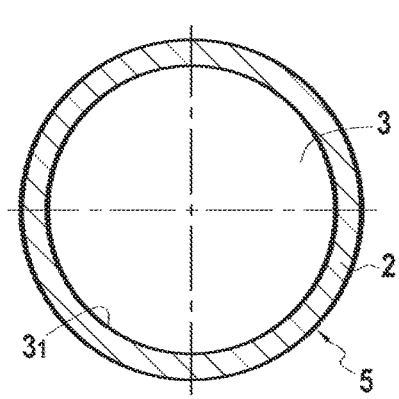
FIGS. 1B and 1C are cross sections of the support taken respectively level with the obstacle and upstream from the obstacle relative to the flow direction of the fluid.
Figure 1B:
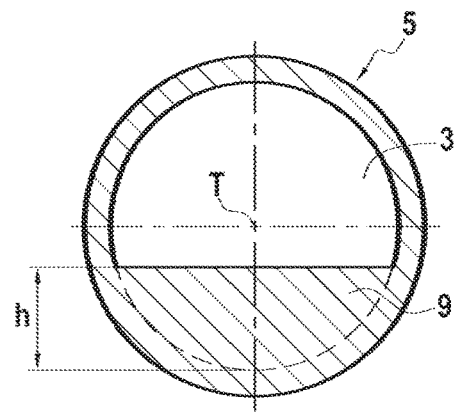

FIG. 1 shows an example of such a tangential flow separator element 1 of tubular shape in which a channel has been provided, however many other shapes could be constructed using the method of the invention. The tangential flow separator element 1 comprises a porous support 2 made to have an elongate shape extending along a longitudinal central axis A, which is why the structure of the porous support is said to be rectilinear. The porous support 2 shown in FIG. 1 is of circular right cross-section, and thus presents an outside surface 5 that is cylindrical, however the right cross-section could be of any shape or polygonal. The term "section" is used to designate the shape defined by a volume being intersected by a plane, with the right section of a cylinder being the shape defined by the cylinder being intersected by a plane that is perpendicular to the longitudinal central axis.

According to a characteristic of the invention, the outside or peripheral surface 5 of the support presents a profile that is constant. It should be recalled that the profile corresponds to the outside shape of the porous support 2 taken in a transverse plane containing the longitudinal central axis A. In the example shown, the profile of the support 2 is rectilinear and constant from the inlet to the outlet. In other words, a profile that is constant means that all of the outside generator lines parallel to the central axis of the support are straight lines that are all parallel to one another.

In other words, the outside surface 5 does not present any surface irregularity other than irregularities generated by the intrinsic porosity of the material or generated by surface roughness inherent to the shaping method proper. Thus, the outside surface 5 does not possess any deformation or indentations.

Figure 2:
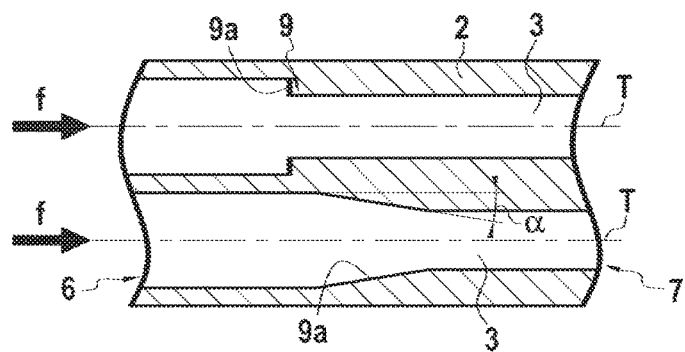
FIG. 2 is a longitudinal section of a support showing an obstacle generating both a sudden narrowing and also a converging nozzle.

The porous support 2 is arranged to include at least one channel 3, and in the example shown in FIG. 1 it has one channel 3, while in the example shown in FIG. 2 it has two channels 3. Each channel 3 extends parallel to the axis A of the support along a longitudinal axis T that advantageously coincides with the axis A of the support in a single-channel support. Each of the channels 3 presents a surface that is covered by at least one separator layer 4 that is to come into contact with the fluid medium for treatment flowing inside the channels 3. A portion of the fluid medium passes through the separator layer 4 and the porous support 2, such that this treated portion of the fluid, referred to as the "permeate", flows through the outside surface 5 of the porous support. The fluid for filtering flows between an inlet zone and an outlet zone in the flow direction represented by the arrow f.

In the example shown, the inlet zone 6 is situated at one end of the tubular support, and the outlet zone 7 is situated at the other end.

Typically, the thicknesses of the filter separator layers lie in the range 1 micrometer (µm) to 100 µm. Naturally, to be able to perform their separation function and act as an active layer, the separator layers present a mean pore diameter that is smaller than the mean pore diameter of the support. Usually, the pore diameter of the filter separator layers is less than the mean pore diameter of the support by a factor of at least 3, and preferably by a factor of at least 5.

The concepts of a separator layer for microfiltration, for ultrafiltration, and for nanofiltration are well known to the person skilled in the art. It is generally accepted that:
  microfiltration separator layers present a mean pore diameter lying in the range 0.1 µm to 2 µm;
  ultrafiltration separator layers present a mean pore diameter lying in the range 0.1 µm to 0.01 µm; and
  nanofiltration separator layers present a mean pore diameter lying in the range 0.5 nm to 2 nm.

It is possible for this so-called "active" micro- or ultrafiltration layer to be deposited directly on the porous support (for a single layer separator layer), or indeed for it to be deposited on an intermediate layer of smaller mean pore diameter, itself being deposited directly on the porous support (for a single-layer separator layer).

By way of example, the separator layer may be based on all constituted exclusively by one or more metal oxides, carbides, or nitrides, or by ceramics, where the term "ceramics" covers all non-metallic inorganic materials. In particular, the separator layer may be based on, or may be constituted exclusively by, $TiO_2$, $Al_2O_3$, and $ZrO_2$, singly or in a mixture.

By way of example, the separator layer may also be based on or constituted exclusively by a collodion of a polymer deposited on a porous support of organic nature. By way of example, the separator layer may also be based on or constituted exclusively by a metal deposited on a porous support of metallic nature.

According to an essential characteristic of the invention, the support is shaped to have at least one and more generally a series of obstacles 9, starting from the inside walls $3_1$ of the channels and which obstacles are suitable for generating disturbances in the flow and for generating shear forces of amplitude that is sufficient to cause recirculations to appear, thereby limiting clogging phenomena, or indeed even totally eliminating them. The obstacles form an integral portion of the monolithic porous support, i.e. they result from the shape given to the porous support and are not in any way separate elements that have been fitted thereto. Together, the support and the obstacles form a single porous monolithic element, without connections, interfaces, or joints of any kind.

The material and the porous texture of the obstacles 9 and of the porous support 2 are identical, and the material and the porous texture are continuous between the obstacles 9 and the porous support 2. Thus, the obstacles 9 are mechanically integral with the support, and the obstacles 9 and the support present the same chemical resistance. The obstacles 9 are completely covered by the separator layer, such that they do not reduce, but on the contrary increase, the filter area of the separator element.

The identical nature of the materials between the obstacles 9 and the support 2 means that they are chemically identical at all points, i.e. they are identical in the porous support and in the obstacles.

The identical porous texture covers the porosity, the tortuosity, and the size and distribution of the pores, which are identical at all points of the element, i.e. in the obstacles and in the porous support.

Material continuity means that all points of the element are identical in chemical nature, i.e. there is no chemical discontinuity between an obstacle and the porous support.

Continuity of porous texture means that the porosity, the tortuosity, and the size and distribution of the pores are identical at all points in the element, such that there is no discontinuity of porous texture between an obstacle and the porous support.

The role of the obstacles is to lie on the path of the fluid flowing inside the channels. The obstacles 9 hinder or disturb the passage of the fluid for treatment, which has to flow around them, since they lie between a first position P1 and a second position P2 taken along the longitudinal axis T of the channel. Thus, the first position P1, as defined by the section view C-C of the channel (FIG. 1C), is taken immediately upstream from the obstacle 9 in the flow direction of the fluid for treatment as represented by the arrow f, while the second position P2, as defined by the section view B-B of the channel (FIG. 1B) is taken at the location of the obstacle 9, being situated downstream from the first position P1 in the flow direction f of the fluid for treatment. The obstacles 9 thus give rise to increases in the flow speed of the liquid in register with each of them, thereby generating high levels of surface shear stress and zones of turbulence where clogging phenomena are reduced, or indeed eliminated. The obstacles act as turbulence promoters.

In general manner, the obstacles 9 present a length L taken along the longitudinal axis A of the channel, and a height h taken along a direction perpendicular to the longitudinal axis A and from the inside wall $3_1$ of the channel. In the example shown in FIG. 1, the channel 3 presents the same diameter D both upstream and downstream from the obstacle 9.

The obstacles 9 may be present at intervals that are regular or irregular. The novel support shapes envisaged in the present invention present a repetition of one or more obstacles starting from the wall of each channel to which the obstacles are secured.

In particular, the inside walls of the channels incorporating the obstacles may have portions in relief such as recesses, bulges, fluting, stripes, and/or any other shape suitable for acting as a corresponding number of obstacles for promoting turbulence when the fluid is flowing inside said channels.

In general manner, it should be considered that an obstacle 9 generates a flow right section that is locally modified concerning its shape, its area, its wetted perimeter, or its hydraulic diameter, or that is locally offset, or indeed that is subjected to turning at the location in the channel 3 relative to channel portions situated upstream and downstream from said obstacle, this flow right section for the fluid being taken perpendicularly to the longitudinal axis T of said channel.

As can be seen more clearly in FIG. 2, in the flow direction of the fluid in the channel as represented by the arrow f, an obstacle 9 can generate a sudden narrowing or else a converging nozzle, as represented by the top and bottom channels respectively in FIG. 2. The sudden narrowing presents a radial wall $9_a$ that extends perpendicularly to the longitudinal axis T from the inside wall of the channel. The convergent nozzle presents a wall $9_a$ that slopes relative to the longitudinal axis T at an angle $\alpha$ that is strictly greater than 0° and less than 90°. Naturally, this radial or sloping wall $9_a$ may optionally be connected to the inside wall of the channel via connection fillets.

Naturally, the obstacles 9 may present a very wide variety of shapes for impeding or disturbing the flow of the fluid. The examples below describe various shapes for the obstacles 9 appearing between a portion of the channel situated upstream from its smallest or narrowest flow right section and said smallest or narrowest flow right section, corresponding respectively to a first position and to a second position.

Figure 3A:
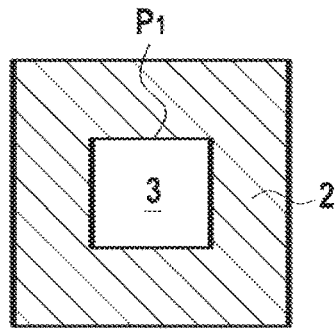
FIGS. 3A and 3B are cross sections of a support taken respectively upstream from and at the obstacle, showing the variation in the flow section of a channel without its area varying.
Figure 3B:
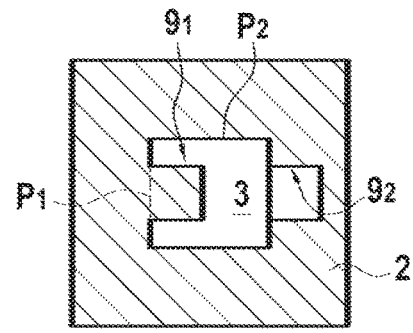

FIGS. 3A and 3B show a first variant embodiment in which the shape of the flow section of the channel varies between the first and second positions, while the area of the flow section remains invariable.

At the first position, the channel presents a right section that is a square of side a, such that the area of this right section is equal to $a^2$ (FIG. 3A). At this position, the channel presents a hydraulic diameter Dh=4A/P, where A is the area of the flow section of the channel and P is the wetted perimeter of the flow section. In this example, the area A is equal to $a^2$ and the wetted perimeter is equal to 4a, such that the hydraulic diameter Dh=a.

At the second position, the channel possesses a square obstacle $9_1$ of side a/2 and a complementary recessed obstacle $9_2$ (FIG. 3B). The area A of the flow right section at this second position is equal to $A=a^2-(a/2)^2+(a/2)^2=a^2$. The area of the right section of the channel does not vary. In contrast, its hydraulic diameter does vary since it is equal to $Dh=4a^2/6a=2/3a$, with a wetted perimeter P=6a that also varies.

Figure 4A:
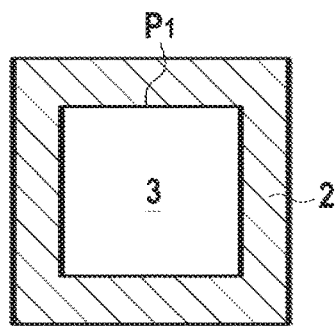
FIGS. 4A and 4B are cross sections of a support taken respectively upstream from and at the obstacle, showing the variation in the flow section of a channel without its wetted perimeter varying.
Figure 4B:
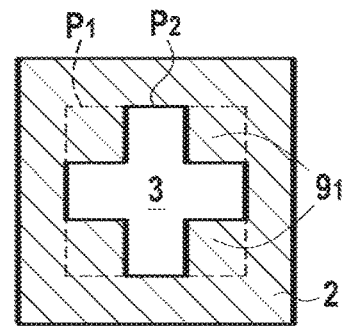

FIGS. 4A and 4B show a second variant embodiment in which the shape of the flow section of the channel varies while the wetted perimeter P remains invariable, with the hydraulic diameter Dh and the area A of the flow section of the passage varying. In this example, the channel 3 in the first position as shown in FIG. 4A presents a right section in the form of a square of side 3a, giving an area A equal to $9a^2$, a wetted perimeter P=12a, and a hydraulic diameter Dh=3a.

The second position, the channel 3 possesses an obstacle constituted by four portions 91 of right section in the shape of respective squares of side a located in each corner of the section of the channel (FIG. 4B). In this second position, the wetted perimeter P is equal to 12a and does not change, whereas the area $A=5a^2$ varies, as does the hydraulic diameter Dh=5/3a.

Figure 5A:
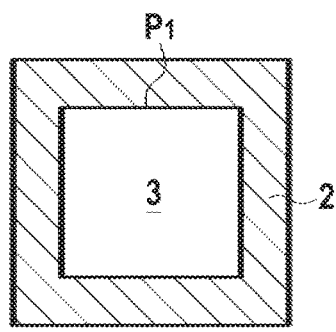
FIGS. 5A and 5B are cross sections of a support taken respectively upstream from and at the obstacle, showing the variation in the flow section of a channel without its hydraulic diameter varying.
Figure 5B:
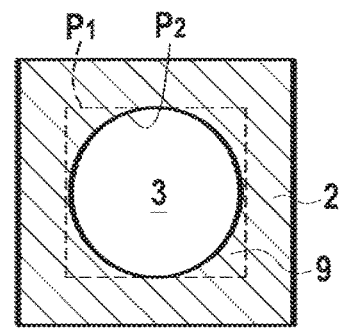

FIGS. 5A and 5B show a third variant embodiment in which the shape of the flow section of the channel varies, while its hydraulic diameter Dh does not vary, although the area A and the wetted perimeter P of the section of the channel do vary. In this example, at the first position shown in FIG. 5A, the channel presents a right section in the form of a square of side a, giving an area $A=a^2$, a wetted perimeter P=4a, and a hydraulic diameter $Dh=4a^2/4a=a$.

At the second position (FIG. 5B), the channel possesses a right section that is circular of radius r=a/2, such that its area $A=\pi r^2=\pi a^2/4$, its wetted perimeter $P=\pi a$, and its hydraulic diameter $Dh=\pi a^2/\pi a=a$.

Thus, its hydraulic diameter remains invariable, while the shape of the section of the channel varies. It should be observed that between the first and second positions, the dimensions vary without turning the section and without off-centering relative to the central axis of the support, however it is clear that provision could be made for the section to be turned and/or for it to be off-centered relative to the central axis of the support.

FIGS. 6A and 6B show a fourth variant embodiment in which the shape of the section of the channel is invariable, whereas the area, the wetted perimeter, and the hydraulic diameter of the section of the channel vary. In a first position P1, the channel presents a shape that is rectangular, while in a second position P2, it presents a right section that is still rectangular in shape, but smaller. It should be observed that between the first and second positions, the dimensions vary without turning the section and without off-centering relative to the central axis of the support, however it is clear that provision could be made for the section to be turned and/or for it to be off-centered relative to the central axis of the support.

In the preceding examples, one of the criteria taken from the following list remains invariable, while the other criteria vary, the criteria being taken from: the shape, the area, the wetted perimeter, and the hydraulic diameter.

In the example shown in FIGS. 7A, 7B, the shape of the flow section of the channel 3 remains invariable, as do the wetted perimeter and the hydraulic diameter of the flow section of the channel. In a first position P1, the channel presents a shape that is circular, and in a second position P2, it presents a shape of the same size that is circular, but that is offset relative to the flow section in the first position. The obstacle 9 is generated by offsetting the circular flow section. Naturally, the flow section could be of any shape. The obstacle 9 thus generates a sudden narrowing. It should be observed that, at the intersection between two portions of offset flow section, the area of the flow section varies. Thus, the area of the flow section of the channel 3 remains invariable except for the intersections between two of said portions of flow section. In the example shown, the flow section of the channel has a disk shape.

It should be observed that the same function of generating an obstacle 9 could be obtained by turning a flow section that is not circular. By way of example, this applies to a flow section of the channel 3 made in the form of an isosceles triangle of shape that remains invariable, as do the area, the wetted perimeter, and the hydraulic diameter of the flow section of the channel. In a first position, the channel bus presents a shape that is triangular, and in a second position it also presents a shape that is triangular, but that is offset angularly by a given value, e.g. equal to 90°.

FIG. 8 shows another embodiment example that involves the orientation of the obstacle 9 inside the channel 3. In this example, the obstacle 9 presents a flow right section that is perpendicular to the longitudinal axis T of the channel, this flow right section turning about the longitudinal axis T of the channel between two positions P1 and P2 taken along the longitudinal axis T. This flow right section turns in discontinuous manner between the ends of the channel, i.e. the length of the obstacle is shorter than the length of the channel. For example, the obstacle 9 is in the form of at least one surface helix such that helix segments appear between the inlet and the outlet of the channel. In this embodiment, the right cross-section of the channel 3 is of shape and of area, in particular, that vary between the inlet and the outlet of the channel 3. Thus, at least one such obstacle generates a sudden narrowing in the flow direction of the fluid for treatment.

In the context of the invention, the porous support, or indeed the tangential flow separator element as a whole, is fabricated by using an additive technique. The method of the invention consists in making the three-dimensional structure of the support by forming individual plies that are superposed and bonded to one another in succession so as to build up the three-dimensional structure of the support progressively.

Compared with prior techniques, the method has the advantage of making the support in a single production step without requiring any tooling or machining, and thus giving access to a wider range of shapes for the support and making it possible to vary the shapes and the dimensions of the obstacles within the channels.

When using a solid material such as a powder, the thickness of the powder bed and thus the thickness of each successively consolidated ply is relatively small so as to enable it to be bonded to the underlying ply, by applying energy or by spraying liquid. In particular, the powder is deposited at a thickness lying in the range 20 µm to 200 µm, which thickness is a function of the additive technique that has been selected.

It is the repetition of the binary sequence that makes it possible, ply after ply, to construct the desired three-dimensional shape. The consolidation pattern can vary from one ply to another. The desired three-dimensional shape is built up along a selected build-up axis.

The grain size of the deposited powder is one of the factors that determines the minimum thickness for each bed of powder, as is the mean diameter of the pores that are finally obtained. In particular, the powder used is a powder of the material that is to constitute the support, e.g. a metal oxide powder, or else a powder of one of its precursors. By way of example, the deposited powder may present a mean grain size of about 35 µm in order to obtain a mean pore diameter within the ceramic support of about 10 µm.

The Applicant has found that by adjusting various parameters such as the selected material, and for a given material, the mean grain size of the powder used, and for a given material and a given grain size, the thickness of the powder bed that is repeated layer after layer, and also by adjusting the various parameters specific to the technology selected for consolidation, it is possible to obtain a residual interconnected pore texture within the consolidated monolith in a manner that is well-controlled. This residual pore texture is the result of controlled sintering of the powder grains so as to leave interconnected voids between the grains.

When using an energy beam, the main parameters on which it is possible to act are its focus, i.e. the diameter of the beam where it impacts the bed of powder, the speed with which the bed of powder is scanned by the beam of photons or of electrons, and indeed the percentage overlap between impact areas of the energy beam while constituting a ply.

When using liquid spraying, the main parameters on which it is possible to act are the weight of the drops, their frequency, the speed with which the powder bed is scanned by the "jet" of drops, and indeed the percentage overlap during successive passes.

The Applicant has also observed that, by modulating the various above-described parameters, it is possible to adjust the size distribution of the pores, and for each given population of pores, to control the number and the tortuosity of the pores.

Once the powder has agglomerated in the selected zones, the non-agglomerated material is eliminated by any appropriate technique. The initial fluidity of the powder used facilitates this operation. It is also possible to use water jet techniques or vibration to remove the last traces of powder remaining on the surface of the shape that has been made.

The final consolidation of the filter element and the final state of the porous texture are usually obtained by one or more subsequent heat treatments for the purpose of eliminating binders (de-binding) and/or of subjecting the material to sintering proper. The temperature selected for such final sintering is a function of the nature of the inorganic material used and of the mean grain size of the powder used.

The support, or indeed the entire tangential flow separator element, is thus built up ply after ply. To do this, computerassisted design (CAD) software is used before starting to subdivide the three-dimensional structure of the support or of the tangential flow separator element that is to be made into slices. The virtual three-dimensional object that is to be made is thus subdivided into two-dimensional slices of very small thickness. These thin slices are then made one by one, in the form of individual plies that are superposed and bonded together so as to build up the desired three-dimensional shape progressively.

This three-dimensional structure is made:
either by repeating the following steps:
  making a bed of solid material (organic or inorganic powder) or of liquid material (organic precursor or liquid in which a powder is dispersed, which powder may be organic or inorganic) that is to form the porous support, the bed being of constant thickness over an area greater than the section of said porous support taken at the level of the ply; and
  localized consolation of some of the material to form a pattern that is determined for each ply, so as to create the individual ply, while simultaneously bonding the individual ply as made in this way to the preceding ply;
or by creating successive beads of material formed by melting an organic or inorganic powder sprayed into the beam of a laser so as to form the predetermined pattern for each ply;
or else by continuous or discontinuous (dropwise) melting of a string of a thermofusible solid precursor. When the precursor is a thermofusible organic polymer used on its own, the support is of organic nature and can be used immediately for depositing a layer of organic nature. When the precursor is a mixture of a thermofusible organic polymer and of a ceramic or metallic inorganic powder, then after the polymer used as a binder has been eliminated and after the grains of the inorganic powder have been sintered, the support is of inorganic nature.

In general manner, in the first situation, the material used is either solid or liquid, and individual plies are consolidated by delivering energy or by spraying a liquid in fine droplets. Energy may be delivered in localized manner by using a directed light beam (by light-emitting diode (LED) or by laser) or by using a beam of directed electrons, or indeed by using any energy source that can be focused and scanned over the bed of powder in the pattern selected by CAD. Interaction between the energy and the material then gives rise, either to sintering, or to the material melting and solidifying, or indeed to the material being subjected to photo-polymerization or photo-cross-linking, depending on its nature and on the nature of the energy source used.

Liquid may be delivered in localized manner using micro droplets created by means of a piezoelectric system, which droplets may optionally be charged and directed using an electrostatic field. The liquid should be a binder or an agent for activating a binder that has previously been added to the ceramic powder.

Compared with prior techniques, the use of an additive technique as envisaged in the context of the invention makes it possible firstly to obtain an improvement in terms of production reliability and rate, and secondly to obtain a wide range of support shapes and of shapes for portions in relief that can be formed in the channel(s) inside the support.

In the context of the invention, various additive techniques can be used for designing the three-dimensional shape, as described below.

Selective Laser Sintering (SLS) or Selective Laser Melting (SLM)

With this technique, a powder of the material that is to constitute the support or the tangential flow separator element, an organic powder, or preferably a powder of inorganic material made of metal or of a ceramic of oxide, nitride, or carbide type, or indeed a powder for a precursor thereof, is deposited so as to form a continuous bed. A powerful laser beam is then applied locally in the selected pattern and serves to agglomerate the powder so as to form the ply corresponding to the support or to the tangential flow separator element, and to bond it to the preceding ply by sintering. Under the effect of localized energy delivery, the powder grains melt in part and become welded together, thereby making the ply cohesive, and thus performing pre-sintering of the shape that is being made. Thereafter, a new powder bed is spread and the process begins again.

The laser beam scans the surface of the powder so as to consolidate the material in the desired pattern, ply by ply. The scanning is performed by moving the laser along parallel paths. It may be advantageous for the impact areas of the laser to overlap between two successive parallel paths. The quantity of energy received by the powder bed at the location of the impact of the laser beam must be such that the melting of the powder grains remains partial, or in any event such that each grain melts sufficiently to become bonded with its closest neighbors without closing the porous texture.

The adjustments of the machine thus depend in particular on the intrinsic characteristics of the powder bed and of the nature of the material that define the effectiveness of the interaction between photons and material.

By way of indication, it is possible to use the conditions corresponding to the ranges set out in Table 1 below:

TABLE 1

|  | Min | Max |
| --- | --- | --- |
| Mean rain size of the ceramic powder | 10 μm | 100 μm |
| Thickness of the powder bed | 40 μm | 200 μm |
| Power of the laser | 50 watts (W) | 1000 W |
| Travel speed of the laser | 0.5 meters per second (m/s) | 10 m/s |

By locally adjusting the focus of the laser beam and/or the travel speed of the beam, it is possible to adjust the quantity of energy that is received by the powder bed, and thus to adjust the resulting densification of the ceramic material, thereby adjusting its porous texture. It is thus possible, at certain locations, to obtain a porous texture corresponding to that desired for the filter separator layer, and at other locations, to obtain a porous texture corresponding to that desired for the support.

Although sintering is performed progressively while building up the support or the tangential flow separator element by applying the laser, it is advantageous to make use of a final sintering step after the support or the tangential flow separator element has been fully built, in order to release the residual mechanical stresses and make the porous texture more uniform. The temperature selected for such final sintering should be a function of the nature of the inorganic material used and of the mean grain size of the powder used, for example, when using titanium oxide, a temperature in the range 1300° C. to 1500° C. should be used.

It should be observed that the above-described selective melting of powder can be obtained in analogous manner by an electron beam, which corresponds to the electron beam melting (EBM) technique.

3D Printing

The principle remains the same, but with printing the deposited plies may correspond to a powder mixture that may be organic or inorganic, ceramic or metallic, which powder may be the material constituting the support, or a precursor of that material, together with a binder, which may itself be in the form of a powder or of a coating on the inorganic powder itself. Preferably, the mixture is uniform and the particles of the powder of the material constituting the support or a precursor for that material, and the particles of the binder present sizes that are similar. As examples of binders, mention may be made of furan, phenolic, and amino resins. The percentage by weight of binder should lie in the range 1% to 25% depending on its nature and on the mean diameter of the powder used. Thereafter, an agent for activating the binder is sprayed in the form of very fine droplets in the selected pattern and causes the powder to agglomerate locally. The activator agent may be a solvent for the binder, which after drying almost instantaneously, serves to bind the inorganic particles together adhesively or to imprison them inside a solid lattice.

It is also possible to deposit only an organic or inorganic, ceramic or metal powder of the material that is to constitute the support, or a powder of a precursor thereof, in order to form a continuous bed, and then to spray a binder locally, which binder should then be a fast-drying liquid adhesive or a thermosetting liquid resin.

Binder or activator agent in liquid form is sprayed by using any appropriate device, and in particular a piezoelectric system of the kind used in inkjet type printers, with scanning that can be implemented by moving a print head along parallel paths. It may be advantageous for the impact areas of the drops to overlap between two successive parallel paths.

After eliminating the powder that has not been agglomerated, the binder is eliminated during the sintering heat treatment, this debinding usually coming to an end before reaching 500° C.

With the grains of the ceramic powder having a mean size lying in the range 30 µm to 100 µm, 3D printing makes it possible to make the powder bed at a thickness lying in the range 80 µm to 300 µm and to reach linear construction speeds for the desired shape lying in the range 25 millimeters per hour (mm/h) to 100 mm/h.

Lithography-Based Ceramic Manufacturing (LCM)

LCM is a technique in which the ceramic powder is pre-mixed with a photo-polymerizable resin, with the consolidation by polymerization being obtained using an LED or laser light source. As in the above-described techniques, it is necessary to eliminate the non-cross-linked powder before the sintering heat cycle that serves to remove binder, i.e. to eliminate the proto-polymerizable resin followed by sintering proper. The use of LCM is limited by the fact that the powder grains must be transparent at the wavelengths under consideration in order to achieve bulk polymerization under and around the impact point of the light.

Fused Deposition Modeling (FDM)

FDM is a technique using a thermofusible solid organic polymer optionally having an inorganic powder added thereto. This technique seeks to create successive deposits of beads of material from a string or a tape. The bead of material is made by softening or melting the end of the string or tape, either continuously (extrusion), or discontinuously (drops). Unlike the above-described techniques, there is no prior formation of a bed of material. The plies or beads of material are consolidated by heating.

In a variant of this technique, provision may be made to spray an inorganic powder in order to create successive beads of material, with the powder being sprayed into a laser beam so as to melt before impact.

Stereolithography Using Stereolithography Apparatus (SLA)

This technique, which is similar in principle to the above-described techniques, makes use of a liquid material as a photocurable liquid precursor having an inorganic powder incorporated therein. The beam of photons (LED or laser) scans the layer of liquid and polymerizes it locally.

With 3D printing or LCM, the filter separator layer(s) is/are deposited after the support has been made, after the final sintering operation. A separator layer is deposited, in particular on the surfaces of the channels and the obstacles in the channels of the support, by depositing thereon a suspension containing at least one sinterable composition that is to constitute a filter layer after baking. Such a composition presents a constitution as conventionally used in the production of inorganic filter membranes. The composition contains at least one oxide, nitride, carbide, or other ceramic material, or a mixture thereof, with metallic oxides, nitrides, and carbides being preferred. The sinterable composition is put into suspension, e.g. in water. In order to eliminate the risk of aggregates being present and in order to optimize the dispersion of grains in the liquid, the resulting suspension is milled in order to destroy aggregates and obtain a composition that is made up essentially of individual particles. The rheology of the suspension is then adjusted with organic additives in order to satisfy the hydrodynamic requirements for penetrating into the channels of the supports. Once the layer has been deposited, it is dried, and then sintered at a temperature that depends on its nature, on the mean size of its grains, and of the intended cut-off threshold.

With SLS or SLM, the separator filter layer(s) may be generated simultaneously with building up the support, or they may be deposited subsequently using the conventional deposition methods that are used in membrane production. Once more, the separator filter layer(s) may be deposited from suspensions of particles of the inorganic material that is to be deposited, or of a precursor thereof. Such suspensions are conventionally used in the production of ceramic filter elements. After drying, the or each layer is subjected to a sintering operation that serves to consolidate layers and to bind them to the surface on which they have been deposited. The grain size of the particles present in the suspension is a function of the final desired porous texture for the separator filter layer.

The following examples illustrate the invention, but they have no limiting character.

Tubular elements for tangential flow separation, of the type shown in the figures, were fabricated in accordance with the invention. The support was in the form of a tube having a length lying in the range 300 mm to 1200 mm, of circular right cross-section, and presenting a diameter lying in the range 10 mm to 42 mm, with a plurality of rectilinear channels formed therein parallel to the axis of the tube.

EXAMPLE 1

| SLS/support only | |
|---|---|
| Material | Titanium oxide |
| Mean grain size of the ceramic powder | 35 µm-45 µm |
| Thickness of the powder bed | 50 µm |
| Focusing (diameter of the laser beam at the point of impact with the powder) | 240 µm |
| Atmosphere of the chamber | Air |
| Power of the laser | 200 W |
| Travel speed of the laser | 0.8 m/s |
| % overlap between two laser passes | 15%-25% |
| Final sintering temperature | 1380° C. |
| Duration of the pause at 1380° C. | 2 hours (h) |
| Mean diameter of the resulting pores | 20 µm-30 µm |

EXAMPLE 2

| SLS/support + layer | | |
|---|---|---|
| Material | Titanium oxide | |
| Mean grain size of the ceramic powder | 25 µm-35 µm | |
| Thickness of the powder bed | 40 µm | |
| Focusing (diameter of the laser beam at the point of impact with the powder) | 120 µm | |
| Atmosphere of the chamber | Air | |
| Power of the laser | 200 W | |
|  | Support | Separator layer |
| Travel speed of the laser | 0.8 m/s | 1 m/s |
| % overlap between two laser passes | 15%-25% | |
| Final sintering temperature | 1380° C. | |
| Duration of pause at 1380° C. | 2 h | |
| Mean diameter of the resulting pores | 20 µm-30 µm | 1 µm-2 µm |

EXAMPLE 3

| SLS/support only | |
|---|---|
| Material | Silicon carbide |
| Mean grain size of the ceramic powder | 75 µm-80 µm |
| Thickness of the powder bed | 120 µm |
| Focusing (diameter of the laser beam at the point of impact with the powder) | 120 µm |
| Atmosphere of the chamber | Argon |
| Power of the laser | 200 W |
| Travel speed of the laser | 0.6 m/s |
| % overlap between two laser passes | 30%-35% |
| Mean diameter of the resulting pores | 25 µm-30 µm |

Under such circumstances, no final sintering is necessary.

EXAMPLE 4

| 3D printing | |
|---|---|
| Material | Titanium oxide |
| Mean grain size of the ceramic powder | 30 µm-35 µm |
| Thickness of the powder bed | 80 µm |
| Type of binder | Furan resin |
| % of binder | 20% |
| Linear construction speed of the shape | 30 mm/h |
| Final sintering temperature | 1500° C. |
| Duration of the pause at 1500° C. | 6 h |
| Mean diameter of the resulting pores | 10 µm-12 µm |

In examples 1, 3, and 4, fabrication of the tangential flow separator element was finished off by depositing a separator layer on the surfaces of the channels by using the following suspension:

| Preparation of the suspension by milling in a ball mill | |
|---|---|
| Material | Titanium oxide |
| Mean grain size of the powder before milling | 3.6 µm |
| Titanium oxide/water ratio | 0.4 |
| Duration of milling | 5 h |
| Mean grain size of the powder after milling | 1 µm |
| Add water to adjust rheology | 200 centipoise (cps) to 400 cps |

A microfiltration separator layer having a cut-off threshold of 1.4 µm was obtained after direct deposition on the support performed in the following manner.

The suspension was caused to penetrate into the channels by pumping in order to put it into contact with the surfaces of the channels. The mechanism driving deposition was the liquid from the suspension being attracted through the pores of the porous support.

The thickness of the deposit of titanium oxide particles on the surface, and thus the weight deposited per unit area depends on the time spent by the suspension in the channels of the support.

| | |
|---|---|
| Time spent by the suspension in the channels | 30 seconds |
| Weight deposited in grams per square meter (g/m2) | 50 g/m² to 60 g/m² |

The operation was repeated twice to reach a final deposited weight of about 110 g/m².

| Baking cycle for sintering the layer | |
|---|---|
| Rate of temperature rise up to 1200° C. | 100° C./h |
| Duration of the pause at 1200° C. | 1 h |
| Natural cooling | |

Tangential flow microfiltration separator elements having cut-off thresholds of less than 1.4 µm and tangential flow ultrafiltration and nanofiltration separator elements can be fabricated by making successive deposits on such a first layer, while using increasingly fine suspensions in association with appropriate heat treatment cycles.

The invention is not limited to the examples described and shown, since various modifications can be made thereto without going beyond the ambit of the invention.

The invention claimed is:

1. A monolithic tangential flow separator element for separating a fluid medium for treatment into a filtrate and a retentate, said separator element comprising a rectilinear rigid porous support of three-dimensional structure having arranged therein at least one channel having a wall that is continuously covered by at least one filter separator layer for passing a flow of a fluid medium for treatment in order to recover a filtrate from the outside surface of the porous support, the outside surface of the porous support presenting a profile that is constant, such that all outside generator lines parallel to a central axis of the porous support are straight lines that are parallel to each other, wherein the porous support includes obstacles to the flow of the fluid for filtering on or in the inside wall(s) of the channel(s), the obstacles having identity of material and of porous texture with the porous support and having continuity of material and of porous texture with the porous support, such that the obstacles form an integral portion of the porous support, wherein the obstacles, by appearing between first and second positions taken along the longitudinal axis of the channel, generate a sudden narrowing or a converging nozzle in the flow direction of the fluid for treatment in said channel in order to impede or disturb the flow of the fluid, wherein the sudden narrowing presents a radial wall that extends perpendicularly to the longitudinal axis, and wherein said converging nozzle presents a wall that slopes relative to the longitudinal axis at an angle $\alpha$ that is greater than 0° and less than 90°.

2. The monolithic tangential flow separator element according to claim 1, wherein, between an inlet and an outlet of the monolithic tangential flow separator element, at least one channel provided with obstacles presents a flow right section of varying shape and/or area, and/or wetted perimeter, and/or hydraulic diameter.

3. The monolithic tangential flow separator element according to claim 1, wherein at least one obstacle of a channel generates a flow right section that is locally narrower at the location of said obstacle, said flow right section being perpendicular to the longitudinal axis of said channel, and presenting a shape that is different from the shape(s) of portions of the channel situated upstream and downstream from said obstacle.

4. The monolithic tangential flow separator element according to claim 1, wherein, between a first position situated upstream from the narrowest flow right section, and a second position situated at the narrowest flow right section, one of the criteria taken from the following list remains invariable, while the other criteria vary, the criteria being taken from: the shape, the area, the wetted perimeter, and the hydraulic diameter of the flow right section of the channel.

5. The monolithic tangential flow separator element according to claim 1, wherein, between a first position situated upstream from the narrowest flow right section, and a second position situated at the narrowest flow right section, all of the criteria taken from the following list remain invariable, namely: the shape, the area, the wetted perimeter, and the hydraulic diameter, wherein the flow right section is not circular and is turned.

6. The monolithic tangential flow separator element according to claim 1, wherein at least one obstacle of the channel presents a flow right section perpendicular to the longitudinal axis of said channel, said flow right section turning about the longitudinal axis of said channel between two positions taken along the longitudinal axis of the channel.

7. The monolithic tangential flow separator element according to claim 6, wherein at least one obstacle of the channel presents a flow right section that turns about the longitudinal axis of said channel in discontinuous manner between the ends of said channel.

8. The monolithic tangential flow separator element according to claim 1, further comprising at least one separator layer deposited continuously on the inside walls of the channels and completely covering the obstacles.

9. The monolithic tangential flow separator element according to claim 8, wherein the separator layers or intermediate layers are made of a material that is organic or inorganic.

10. The monolithic tangential flow separator element according to claim 1, wherein the porous support is made of a material that is organic or inorganic.

11. The monolithic tangential flow separator element according to claim 1, wherein the three-dimensional structure of the porous support presents different plies of material corresponding to the width of beds successively bonded, and that can be observed by optical microscopy, or by scanning electron microscopy.

12. A method of fabricating a tangential flow separator element according to claim 1, wherein the three-dimensional structure of the porous support is made by forming individual plies that are superposed and successively bonded to one another to progressively build up the desired three-dimensional shape.

13. The method according to claim 12, comprising making the three-dimensional structure by repeating the following steps:

making a continuous bed of a material that is to form the porous support, the bed being of constant thickness over an area greater than the section of said porous support at the ply; and locally consolidating some of the material to form a pattern that is determined for each ply, to create the individual ply while simultaneously bonding the individual ply as made in this way to the preceding ply.

14. The method according to claim 13, comprising making continuous beds of solid material in the form of a powder, or of a liquid material.

15. The method according to claim 14, wherein the liquid material is a photopolymerizable resin.

16. The method according to claim 12, comprising making a continuous bed of a solid material in the form of an organic or inorganic powder.

17. The method according to claim 12, comprising making a continuous bed of a medium in the form of a photopolymerizable liquid precursor having an inorganic powder disposed therein.

18. The method according to claim 12, wherein each ply is made by continuous or discontinuous melting of a string of a thermofusible solid precursor that is either a thermofusible organic polymer used on its own to make an organic support and an organic layer, or a mixture of a thermofusible organic polymer and of a ceramic inorganic powder, to make a support of inorganic nature.

19. The method according to claim 12, comprising creating successive beads of material by spraying a powder that is melted in a laser beam.

* * * * *